(12) United States Patent
Mathur

(10) Patent No.: US 8,479,880 B2
(45) Date of Patent: Jul. 9, 2013

(54) MULTIFUNCTIONAL NANO-SKIN ARTICLES AND METHODS

(75) Inventor: Gopal P. Mathur, Trabuco Canyon, CA (US)

(73) Assignee: The Boeing Company, Chicago, IL (US)

( * ) Notice: Subject to any disclaimer, the term of this patent is extended or adjusted under 35 U.S.C. 154(b) by 258 days.

(21) Appl. No.: 12/882,600

(22) Filed: Sep. 15, 2010

(65) Prior Publication Data

US 2012/0064285 A1 Mar. 15, 2012

(51) Int. Cl.
| | |
|---|---|
| *G10K 11/165* | (2006.01) |
| *E04B 1/82* | (2006.01) |
| *E04B 1/84* | (2006.01) |
| *F16F 15/04* | (2006.01) |
| *B64C 1/40* | (2006.01) |
| *G10K 11/16* | (2006.01) |
| *E04B 1/74* | (2006.01) |
| *F16F 15/00* | (2006.01) |
| *B64C 1/00* | (2006.01) |

(52) U.S. Cl.
USPC ........... 181/296; 181/292; 181/294; 181/208; 244/119; 244/1 N

(58) Field of Classification Search
USPC ................. 181/296, 290, 292, 294, 288, 207, 181/208, 210, 284; 244/119, 1 N, 117 R, 244/123.13, 121
See application file for complete search history.

(56) References Cited

U.S. PATENT DOCUMENTS

| | | | | |
|---|---|---|---|---|
| 2,819,032 | A * | 1/1958 | Detrie et al. ................... | 244/119 |
| 3,087,569 | A * | 4/1963 | Kurtze ........................... | 181/208 |
| 3,087,570 | A * | 4/1963 | Kurtze et al. .................. | 181/208 |
| 3,087,574 | A * | 4/1963 | Watters ......................... | 181/208 |
| 3,159,249 | A * | 12/1964 | Lazan ............................ | 188/268 |
| 3,330,376 | A * | 7/1967 | Warnaka ....................... | 181/175 |
| 6,372,322 | B1 | 4/2002 | Devaguptapu | |
| 6,566,983 | B2 | 5/2003 | Shin | |
| 7,473,411 | B2 | 1/2009 | Ajayan et al. | |
| 7,687,039 | B2 | 3/2010 | Laugharn et al. | |
| 8,127,889 | B1 * | 3/2012 | Mathur ......................... | 181/290 |
| 8,146,861 | B2 * | 4/2012 | Lengsfeld et al. ............ | 244/121 |
| 2006/0274049 | A1 * | 12/2006 | Spath et al. ................... | 345/173 |

(Continued)

FOREIGN PATENT DOCUMENTS

| | | |
|---|---|---|
| DE | 10 2007 057 491 A1 | 6/2009 |
| EP | 1 659 158 A2 | 5/2006 |
| WO | 2008/070825 A1 | 6/2008 |

OTHER PUBLICATIONS

European Patent Office, European Search Report for Application No. 11181016.4-2124 dated Dec. 5, 2011.

*Primary Examiner* — Edgardo San Martin
(74) *Attorney, Agent, or Firm* — Christopher J. Knors; Morre & Van Allen PLLC

(57) ABSTRACT

Methods for vibration and acoustic abatement. The methods comprise providing a substrate with a composite layer deposited thereon, the substrate receiving a vibration energy sufficient to provide at least one bending wave therein, and converting at least a portion of the vibration energy sufficient to cause the at least one bending wave to at least one shear wave in at least a portion of the composite layer. The composite layer comprises an elastomeric polymer matrix comprising carbon nano tubes dispersed or distributed therein. Articles with the composite layer comprising carbon nano tubes disposed thereon are also disclosed and described.

19 Claims, 5 Drawing Sheets

U.S. PATENT DOCUMENTS

| | | |
|---|---|---|
| 2007/0128960 A1 | 6/2007 | Ghasemi Nejhad et al. |
| 2008/0128202 A1 | 6/2008 | Palumbo et al. |
| 2008/0139722 A1* | 6/2008 | Shefelbine et al. ........... 524/413 |
| 2008/0277057 A1* | 11/2008 | Montgomery et al. .... 156/307.1 |
| 2008/0286564 A1 | 11/2008 | Tsotsis |
| 2010/0025147 A1* | 2/2010 | Kassa .......................... 181/290 |
| 2010/0025533 A1* | 2/2010 | Bimanand et al. ............. 244/121 |
| 2010/0159240 A1 | 6/2010 | Shah et al. |
| 2010/0170746 A1* | 7/2010 | Restuccia et al. ............. 181/290 |
| 2011/0133031 A1* | 6/2011 | Shah et al. .................... 244/119 |
| 2011/0135491 A1* | 6/2011 | Shah et al. ................. 416/241 R |
| 2011/0253475 A1* | 10/2011 | Doneker et al. .............. 181/290 |

* cited by examiner

MULTIFUNCTIONAL NANO-SKIN ARTICLES AND METHODS

TECHNICAL FIELD

The present disclosure relates to methods of vibrational and acoustical abatement and composite layers useful for providing same. The composite layer comprises an elastomeric polymer matrix comprising carbon nano tubes dispersed or distributed therein.

BACKGROUND

Composite materials are typically used in structures, e.g., aircraft, trains, vehicles, industrial machines, etc. because of their light weight and strength. Composite panels are examples of such materials and can be of two sheets of one or two types of materials sandwiched about another type of core material. For example, one type of composite panel has two sheets of a material such as graphite-epoxy, para-aramid synthetic fiber epoxy (Kevlar), fiberglass or aluminum, or a combination thereof, sandwiched about a honeycomb core made from materials such as meta-aramid fiber (NOMEX), aluminum, or paper. The resulting composite structure is light, and stiffer than any of its component parts. However, in such composite panels, sound can be radiated very efficiently because the transverse and/or shear wave speed through the structure can be greater than the speed of sound in air. Thus, the composite structure most often has a supersonic transverse and/or shear wave propagating in it. As compared to metallic structures, such composite structures are very efficient in radiating noise. If the composite structure is intended to form or define an interior space, unacceptable noise can be radiated by the composite structure into the interior space. Current methods of addressing this noise problem include the addition of damping material or noise control material into the composite panel to provide the composite panel with sound and vibrational energy absorption means. Examples of noise reduction and damping materials include a limp mass or a visco-elastic layer applied to one or both of the composite panel's face sheets and/or the inclusion of foam within the composite panel's core (e.g., a honeycomb core). However, these extra noise-control materials add cost, weight, and complexity to the composite panel. For example, the combined process of adding damping and fiberglass insulation blankets is labor intensive and adds considerable weight. Moreover, damping tiles are expensive and must be individually installed (by hand) on each panel. Consequently, interior noise control of launch vehicles, aircraft, rotorcraft, and other vehicles poses significant technical challenges as it must take into account weight, cost, and system performance. Thus, at least one technical problem left unresolved is changing the acoustic properties of a composite structure for improved performance with minimum weight, cost, and complexity impact.

Also, conventional composite structures have poor thermal and electrical conductivities requiring extensive additional work to improve these properties. As conventional noise control treatment (for example, in aerospace vehicles) systems typically consists of several non-conductive elements, e.g., damping, fiberglass blanket, acoustic foam, trim panel, isolators, etc. Therefore, extensive additional measures are taken to provide for electrical conductivity to the structure, e.g., into the fuselage, for various purposes, such as incorporating metallic wire mesh for electrical conductivity and grounding in the above solutions. Thus, another technical problem left unresolved is providing simpler, more robust, and improved composite structures with minimum weight, cost, and complexity impact and sufficient electrical and thermal properties that would eliminate or reduce the need for changes in electrical and thermal conductivities.

SUMMARY

Accordingly, it is an object of the present disclosure to provide a composite structure capable of low noise transmission while also possessing good strength, low weight, and conductive characteristics suitable for aerospace vehicles and other load-carrying transport vehicle applications. Briefly, disclosed and described herein is an innovative coating or layer and articles therefrom that comprises carbon nantotubes such that a nano-skin or nano-infused composite skin as a surface layer, add-on, or integral layer of a composite is provided. Such a composite structure substantially reduces, eliminates, or abates acoustic radiation and improves thermal and electrical conductivities of the composite.

In a first embodiment, a method is provided, the method comprising providing a substrate comprising a composite layer deposited thereon, the substrate being formed to provide at least one bending wave therein in response to receiving a vibration energy sufficient to cause the at least one bending wave in the substrate. At least a portion of the vibration energy sufficient to cause the at least one bending wave is converted to at least one shear wave in at least a portion of the composite layer. The composite layer comprises an elastomeric polymer matrix comprising carbon nano tubes dispersed or distributed therein. In one aspect, the elastomeric polymer matrix comprising carbon nano tubes is adjacent at least one face sheet. In another aspect, the elastomeric polymer matrix comprising carbon nano tubes is positioned between opposing face sheets.

In a second embodiment, a method of attenuating acoustic vibration energy in an aerospace vehicle is provided. The method comprises providing a fuselage comprising a composite layer deposited thereon, the fuselage being formed to provide at least one bending wave therein in response to receiving a vibration energy sufficient to cause the at least one bending wave in the fuselage, and converting at least a portion of the vibration energy sufficient to cause the at least one bending wave to at least one shear wave in at least a portion of the composite layer. The composite layer comprises an elastomeric polymer matrix comprising an amount of carbon nano tubes sufficient to convert the vibration energy sufficient to cause the at least one bending wave from the fuselage into the at least one shear wave in the composite.

In a third embodiment, an article is provided comprising a composite layer comprising a substrate, a first layer disposed on a surface of the substrate, the first layer comprising an elastomeric polymer or elastomeric pre-polymer and a predetermined amount of carbon nano tubes dispersed or distributed therein. The composite comprises an amount of the carbon nano tubes sufficient to receive at least one bending wave from the substrate and to convert the at least one bending wave to at least one shear wave in at least a portion of the composite. Optionally, a second layer is disposed between the substrate and the first layer. In an aspect, a core material is sandwiched between opposing face sheets and the first layer is adjacent thereto.

Other aspects and features disclosed and described herein, as defined solely by the claims, will become apparent to those ordinarily skilled in the art upon review of the following non-limited detailed description of the invention in conjunction with the accompanying figures.

DETAILED DESCRIPTION

Figure 1A:
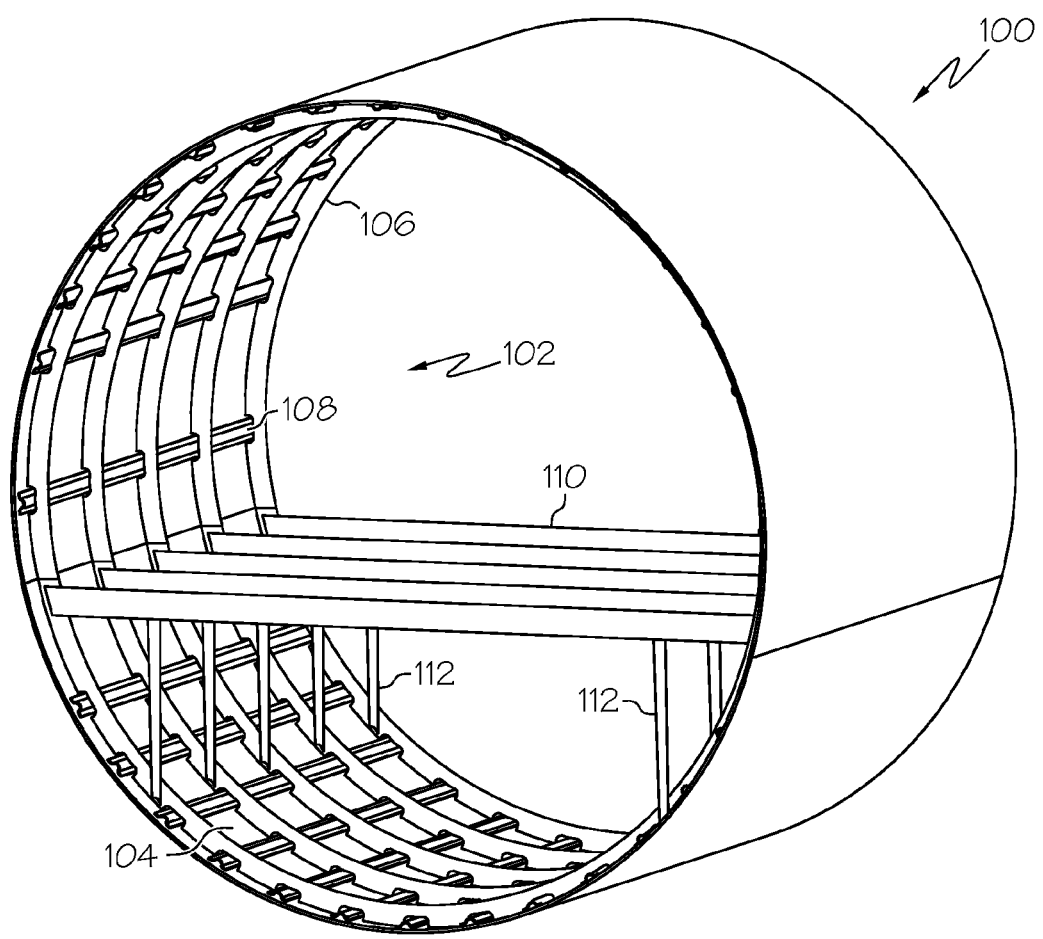
FIG. 1A is a perspective view an exemplary fuselage structure including a nano-skin as disclosed and described herein.

As used herein, the phrase "carbon nano tube" (CNT, plural CNTs) refers to any of a number of cylindrically-shaped allotropes of carbon of the fullerene family inclusive of single-walled carbon nano tubes (SWNTs), double-walled carbon nano tubes (DWNTS), and multi-walled carbon nano tubes (MWNTs). CNTs can be chemically modified (or functionalized), capped by a fullerene-like structure, or open-ended. CNTs include those that encapsulate other materials and include encapsulated material together with the CNT.

As used herein, the term "matrix" refers to a heterogeneous or a homogeneous bulk material that can serve to organize CNT in particular orientations, including random orientation. The matrix can benefit from the presence of the CNT by imparting some aspects of the physical and/or chemical properties of the CNT to the matrix. The matrix can be a polymer or polymerizable formulation. The matrix can be provided as a liquid, semi-solid, or gel and can be formulated to cure (or set) to a solid, semi-solid coating, sheet, or layer. For example, the matrix can be a curable elastomer, such as a polysilicone elastomer composition capable of moisture curing at or around ambient conditions. In various aspects, the combination of an elastomeric polymer matrix and a predetermined amount of CNT constitutes the nano-skin layer or a portion of a nano-infused composite layer, as further described below.

At low frequencies, a composite sandwich structure is believed dominated by bending of the entire structure. At high frequencies, the response is mostly controlled by the bending characteristics of the face sheets of the composite. In the mid frequency region, transverse shear stress in the sandwich core governs. Vibrational wave propagation in a honeycomb sandwich structure and composite sandwich structures with (solid) cores are generally similar. The instant nano-skin or nano-infused composite layer disclosed herein provides for a simple and robust construction for acoustic abatement. In one aspect, the nano-skin or nano-infused composite layer is a composite skin with nano-infused outer or inner (or "skin") layer ("nano-skin"). This configuration provides a face sheet comprising embedded CNT's that gives an acoustically inefficient composite sandwich design. The primary mode of operation of nano-skin or nano-infused composite layer disclosed herein is not based on absorbing vibration and/or sound energy, e.g., by visco-elastic damping, however, such absorption can take place to a limited extent, or by a Helmholtz resonator absorptive mechanism. Thus, the nano-skin or nano-infused composite layer is not configured to absorb acoustic energy in a manner similar to that of fiberglass blankets, however, some absorption of the energy will likely take place. Nor does the nano-skin or nano-infused composite layer need to be "tuned" to operate at very low temperatures, in contrast to existing visco-elastic dampers. As a result, the nano-skin or nano-infused composite layer provides for a lightweight, more efficient means for reducing overall acoustic control treatment weight for structures sensitive to additional weight burden, and is essentially insensitive to temperature, so as to be an add-on or integral part of the structure to simplify installation.

Thus, articles and structures comprising a nano-skin or nano-infused composite layer are capable of converting at least a portion of the vibration energy, represented for example, as noisy flexural waves impinging upon and propagating in a structure, into quieter, vibration waves in the attached nano-skin or nano-infused composite layer. The nano-skin or nano-infused composite layer further provides, alone or in combination with the acoustic reduction, improved thermal and electrical conductivities to the surface of the composite structure. When attached to a noisy structure, for example, a fuselage of a supersonic aerospace vehicle, the nano-skin or nano-infused composite layer significantly reduces acoustic radiation from the base structure to the surrounding ambient environment. While not to be held to any particular theory, reducing the speed of propagating supersonic waves below the speed of sound via the conversion of bending vibration modes to shear modes of vibration through a medium containing carbon nano tubes, the transmission loss of a composite structure can be improved by as much as 10-15 dB.

The speed of the converted shear waves in the matrix material is defined by equation (1):

$$Cs = \left[\frac{Gc}{\rho c}\right]^{1/2}. \tag{1}$$

where, Gc is the shear modulus and ρc is the density of the composite core.

In a skin-stringer composite structure common in aerospace vehicle fuselages, supersonic bending waves propagate in the structure making it an acoustically efficient structure. Currently, while interior noise in such structures can be mitigated, there is no easy way to more effectively eliminate the resultant interior noise by slowing down the supersonic bending waves in these composite structures, thus requiring additional complexity to conventional composites. The nano-skin layer disclosed and described herein converts at least a portion of the energy carried by the supersonic bending waves in such structures into sub-sonic (shear) waves directed generally transverse to the bending waves, thereby significantly improving energy transmission loss and as a result, further reduces the generated interior noises from such structures. Thus, the nano-skin layer effectively reduces the speed of propagating flexural waves in such structures to below the speed of sound (in the ambient medium) within the nano-composite skin, and therefore significantly reduces sound radiation from the structure. In various aspects, the nano-skin or nano-infused composite layer is configured such that subsonic wave speeds are produced from supersonically-induced vibration energy. For example, a nano-composite face sheet can be configured as part of the composite structure to provide for conversion of supersonically induced vibration energy (e.g., flexural wave speeds) to shear waves of subsonic speed, thus providing damping for reduced acoustic radiation from the substrate or structure.

In other aspects the nano-skin or nano-infused composite layer provides for thermal and electrical conductivity. The nano-skin layer can improve the thermal and electrical conductivities of the composite structure due to the use of CNT constituents. For example, CNTs modified to contain ionic substituents can be employed. Suitable ionic substituents can be salts of carboxylic acids or of amine bases. In addition, the nano-skin or nano-infused composite layer is configurable to meet stringent FAA fire/smoke criteria, in that the CNTs are essentially pre-combusted materials.

In one embodiment disclosed herein, a matrix with a predetermined concentration of carbon-fiber structure with nanoscale features is provided. In one aspect, the nano tubes are at least more aligned along a predetermined axis than a random orientation ("preferentially oriented"). Preferential orientation is inclusive of any degree of orientation distinguishable from purely random orientation, for example, greater than 50% orientation normal to the surface of the structure. In one aspect, the preferentially oriented nano tubes are normal to the surface of the structure or the carbon nano tubes are preferentially oriented parallel to the surface of the structure. Preferential orientation of the nano tubes can be provided using stress (e.g., extrusion through reduced diameter orifices) during fabrication of the composite or by the application of external forces (e.g., magnetic or electrical fields) during fabrication or prior to setting of the matrix, or carbon nano tubes can be vertically grown on a fiber or substrate using conventional methods. Modification of the nano tubes to provide for preferential orientation is envisaged, such as providing electrically charged appendages or magnetic particles about the nano tubes. Such modification can also be used to determine the degree of preferential orientation of the nano tubes in a matrix, for example, by comparison of an anisotropic property relative to a purely randomly oriented sample.

According to various embodiments, the nano-skin formulation comprises a matrix with a weight percentage of carbon nano tubes ranging from about 0.01% to about 10% by weight, or from about 0.1% to about 7% by weight, or more preferably from about 3% to about 5% by weight.

Typically, SWCNTs are of an average diameter of about 1 nanometer to about 1.5 nanometers. MWCNTs are of an average diameter of about 10-30 nanometers, typically about 15 nanometers. MWCNT of greater average diameter, for example, up to 100 nanometers can be used. Metal catalysis can be used to grown the nano tubes of a desired diameter directly on the surface of at least a part of the composite. The average diameter of the carbon nano tubes or combination thereof useful for the embodiments disclosed herein, alone or in combination with the weight percent of carbon nano tubes in the matrix, can be varied to fit a desired need or to provide desired properties, including, for example, vibrational energy conversion, thermal conductivity, and electrical conductivity. Thus, if improved strength and conductivity is desired in the composite, the amount of MWCNT can be increased, for example.

The matrix material of the nano-skin or nano-infused composite layer can be any thermoplastic elastomer or thermosetting elastomeric material. In one aspect, the matrix is a polydimethylsiloxane (PDMS) polymer or a fluorocarbon elastomer material. In another aspect, the choice of the matrix material can be made based on the expected temperature ranges during operation (normal or non-normal use) of the structure. For example, PDMS can be employed for low temperature operation, fluorocarbon elastomers for high temperature operation. Other elastomer matrix materials can be used in combination with the CNT's, for example, polyurethane elastomers, SANTOPRENE® (a blend of thermoplastic and thermoset rubber), styrene-butadiene elastomers, ionomers, thermoset rubber, and combinations thereof.

In a specific aspect, a thermosetting polymer PDMS (polydimethylsiloxane) can be used as the matrix material, with about 3-5% SWCNT dispersed or distributed therein. PDMS has a glass-transition temperature of less than about −120° C. Typical envisaged use temperatures for acoustic abatement applications can range from below −40° C. to greater than about 150° C. The low glass-transition temperature—coupled with a less temperature-dependent viscosity and high thermal stability—makes siloxanes such as PDMS very useful for such applications with a broader range of temperatures. When comprised with CNT, the tensile modulus and consequently the shear modulus of the PDMS nano-composite layer can be improved significantly, by as much as 100-200%. With appropriate variation in shear modulus of the PDMS nano-composite, subsonic shear waves can be supported within the nano-composite core layer. The thickness, % of CNT, density of PDMS and other parameters can be selected by designing the matrix material to support subsonic shear waves in the core within the desired frequency range, for example, 100-5000 Hz. The transition frequency for shear waves from the whole section bending waves can be calculated from known formulae found in the literature.

The following detailed description of the various embodiments disclosed and described herein refers to the accompanying drawings, which serve to illustrate specific, exemplary embodiments disclosed and described herein. Other embodiments having different structures and operations are envisaged and do not depart from the scope disclosed and described herein.

Figure 1B:
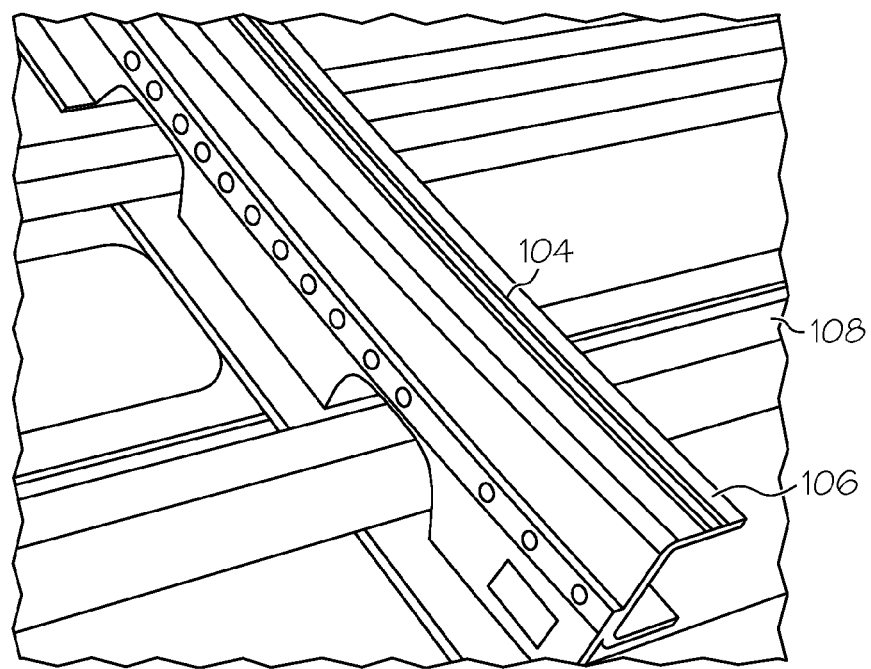
FIG. 1B is a perspective view of a skin-stringer including a nano-skin as disclosed and described herein.

FIGS. 1A and 1B are a perspective view and a partial view, respectively, of an exemplary fuselage structure 100, for example, of an aerospace vehicle, including a complex internal framework 102. The internal framework 102 includes a multiplicity of frames 106 and longerons/stringers 108 covered by nano-skin layer 104 as further disclosed and described below. Typically, a plurality of floor joists 110 may extend between opposite sides of the fuselage structure 100 and may be attached to the stringers 108 on opposite sides of the fuselage structure 100. The plurality of joists (or floor beams) 110 provides support for a floor for a passenger compartment or an upper cargo compartment. A vertical beam 112 may be attached to each of the floor joists 110 to provide additional structural support. Discrete portions or each and every portion of these structural components can be covered with a nano-skin layer as herein disclosed and described. While the illustrated structure includes multiple components that are complex to manufacture, assemble, and inspect, the nano-skin layer can be incorporated to such a complex structure without disassembly of the fuselage, for example, by applying a coating of nano-skin or providing individual components previously coated with the nano-skin. Additional noise abatement materials and constructs can be used in combination with the nano-skin layer.

Figure 2:
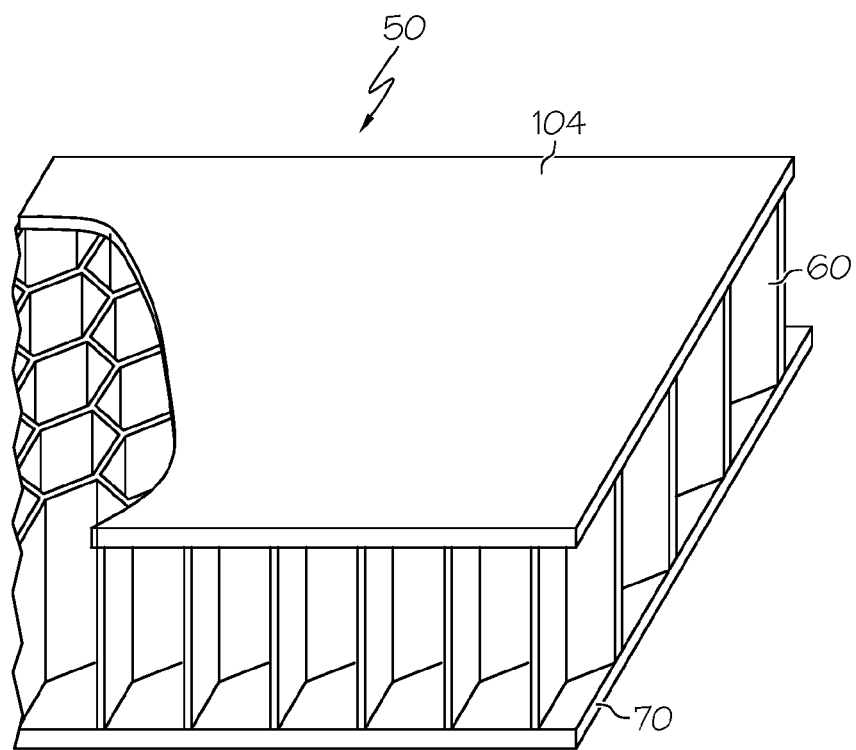
FIG. 2 is a perspective view of a composite structure comprising a nano-skin or nano-infused layer in accordance with an embodiment disclosed and described herein.

FIG. 2 is a perspective view with partial sectioning of a composite structure 50 having nano-skin or nano-infused layer 104. Honey-comb material 60 is positioned between nano-skin layer 104 and face sheet 70. Additional opposing face sheet can be positioned between nano-skin layer 104 and material 60. Nano-skin layer 104 can be bonded with material 60 and/or the opposing face sheet and/or integrated therewith. Other structural forms or shapes of material 60 can be used.

Nano-skin layer 104 can be tailored to the appropriate application using one or more of the following non-inclusive parameters: providing nano-patch regions areas within the skin layer, for example, sections of the skin layer comprised of CNT in combination with regions devoid of CNT, the arrangement of which can be patterned, random or combinations thereof; nano-skin layer thickness; % weight of CNT; choice of matrix material; and overall density of the composite or components thereof. In another aspect, the composite skin layer attached to the structure can be infused or impregnated with carbon nano tube constituents to improve its damping, thermal and electrical properties.

Figure 3:
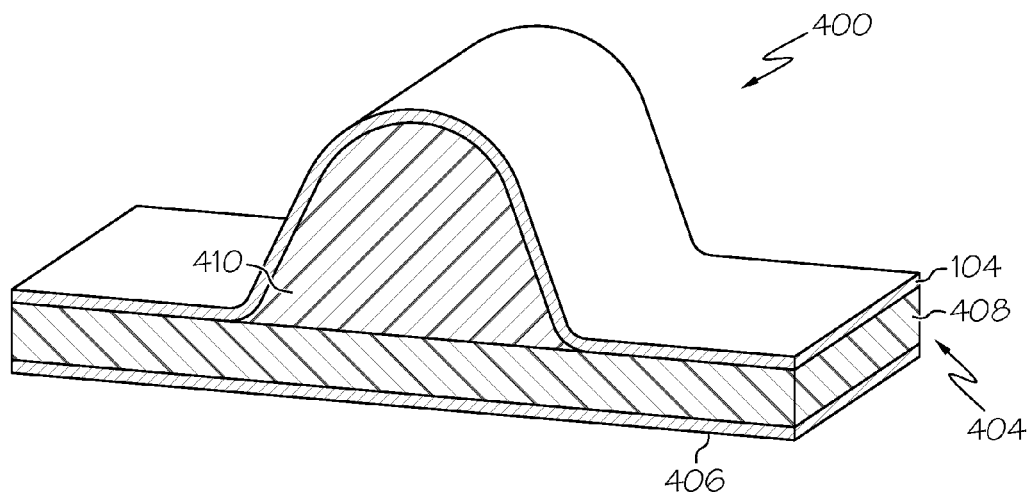
FIG. 3 is a sectional view of an example of an article having a composite structure comprising a nano-skin or nano-infused layer disposed thereon in accordance with an embodiment disclosed and described herein.

FIG. 3 is an example of article 400 coated with nano-skin or nano-infused composite layer that may be used to attenuate acoustic radiation therefrom. By way of example, article 400 can be a section of fuselage for an aerospace vehicle in accordance with an embodiment disclosed and described herein. The article 400 may be coated with nano-skin layer 104 or a composite layer comprised of an inner layer of material of a sandwich structure 404, which includes fuselage portion (substrate) 406. The sandwich structure 404 may be a composite material or fabric, a metallic material or other suitable material. The substrate 406 may include multiple plies of metal, carbon fiber, or other material suitable for aerospace vehicles. A core structure 408 may be disposed on or between the substrate 406. The core structure 408 may be a honeycomb structure of composite material, a foam material, a metallic material or other lightweight, high strength material. A frame core 410 may be disposed on the core structure 408. Frame core 410 may be a foam, honeycomb type material, metallic material or similar material to provide structural integrity and/or acoustic dampening with minimal addition of weight. Nano-skin 104 can be formed on the frame core 410 and the core structure 408. Nano-skin 104 can comprise multi-layers of elastomeric matrix/CNT layers and can further include additional materials, for example, fillers, carbon or glass fiber, etc.

Figure 4:
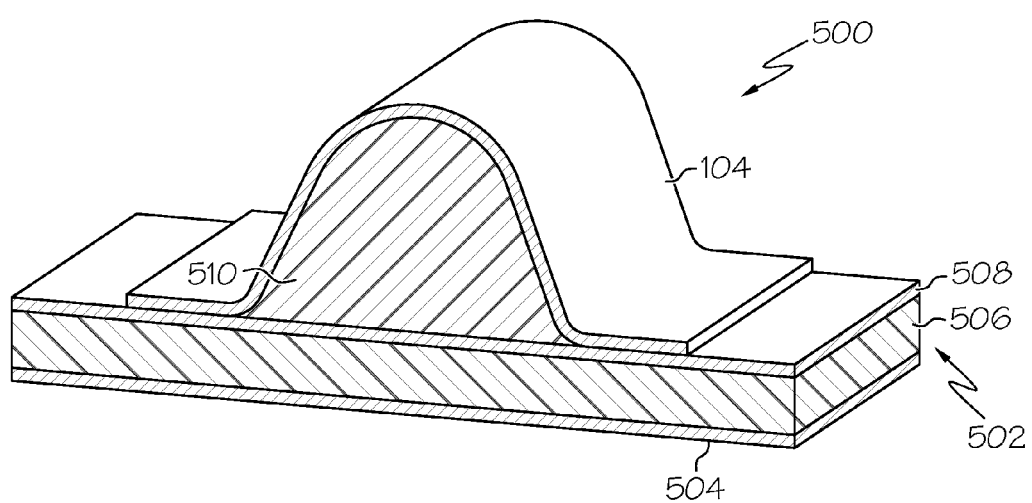
FIG. 4 is a sectional view of an example of an article having a composite structure comprising a nano-skin or nano-infused layer disposed thereon in accordance with an embodiment disclosed and described herein.

FIG. 4 is an example of another construct article 500 that may be used with an optimized fuselage for an aerospace vehicle in accordance with another embodiment disclosed and described herein. The article 500 may be similar to the article 400 of FIG. 3. Accordingly, the article 500 may include a sandwich structure 502. The sandwich structure 502 may include a substrate 504, for example, a section of fuselage as described above for FIG. 3. A core structure 506 can be disposed on the surface of substrate 504. The core structure 506 may be a honeycomb type structure of composite material or the like, a foam structure, a metallic structure or other material. Outer layer of material 508 may be formed on the core structure 506. Outer layer of material 508 may also be a composite material or fabric, a metallic material or other suitable material. Frame core 510 can be disposed on outer layer 508. Frame core 510 may be a foam, honeycomb type structure, metallic structure or similar structure to provide structural integrity and/or acoustic dampening while adding minimal weight to the structure. Nano-skin 104 can be formed over the frame core 510. Nano-skin layer 104 may retain the frame core 510 in place and/or be bonded to frame core 510.

Figure 5:
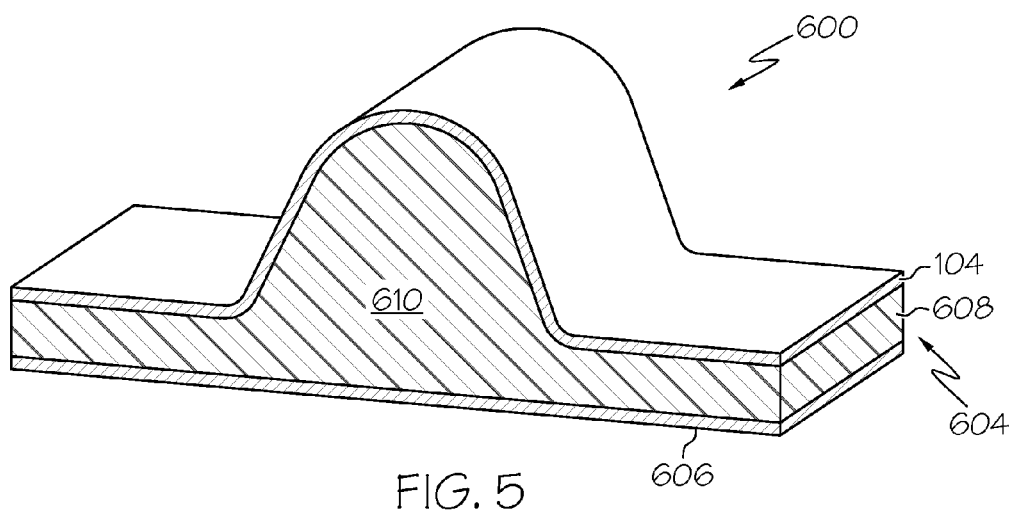
FIG. 5 is a sectional view of an example of an article having a composite structure comprising a nano-skin or nano-infused layer disposed thereon in accordance with an embodiment disclosed and described herein.

FIG. 5 is an example of a further construct article 600 that may be used, for example, with an optimized fuselage for an aerospace vehicle in accordance with a further embodiment disclosed and described herein. Article 600 as shown comprises nano-skin layer 104 integrated with or forming an outer layer of material of a sandwich-like structure 604. Sandwich structure 604 includes substrate 606. Substrate 606 can be carbon fiber composite material or fabric, a metallic material or other suitable material. Core structure 608 can be disposed on the substrate 606. The core structure 608 may be a honeycomb structure of composite material, a foam material, a metallic material or other lightweight, high strength material. A frame core 610 may be integrally formed as one piece with the core structure 608. Nano-skin layer 104 can be formed on the frame core 610 and the skin core structure 608.

Figure 6:
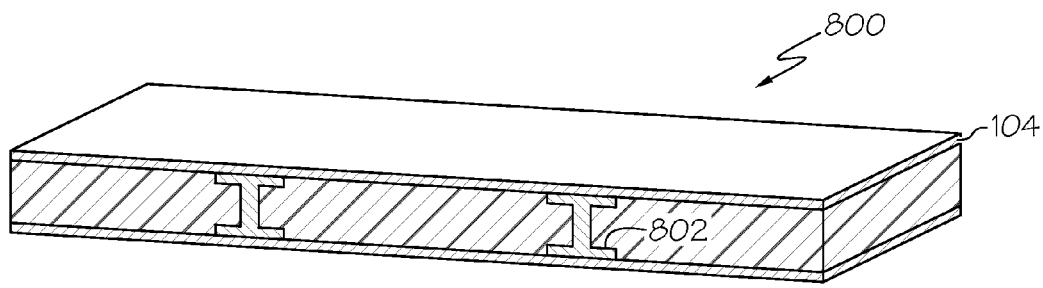
FIG. 6 is a sectional view of an example of an integrated keel beam article having a composite structure comprising a nano-skin or nano-infused layer disposed thereon in accordance with an embodiment disclosed and described herein.

FIG. 6 is an example of an integrated keel beam 800 with an I-beam structure or structures 802 with a nano-skin layer 104 that may be used for acoustic abatement of a fuselage in accordance with another embodiment disclosed and described herein.

Figure 7:
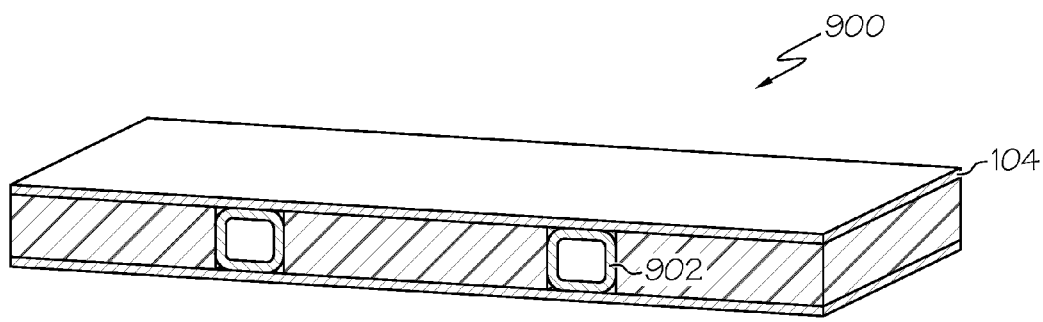
FIG. 7 is an example of another integrated keel beam article having a composite structure comprising a nano-skin or nano-infused layer disposed thereon in accordance with an embodiment disclosed and described herein.

FIG. 7 is an example of a further integrated keel beam 900 with a box beam structure or structures 902 or any suitable structure with a nano-skin layer 104 that may be used in accordance with a further embodiment disclosed and described herein.

Figure 8:
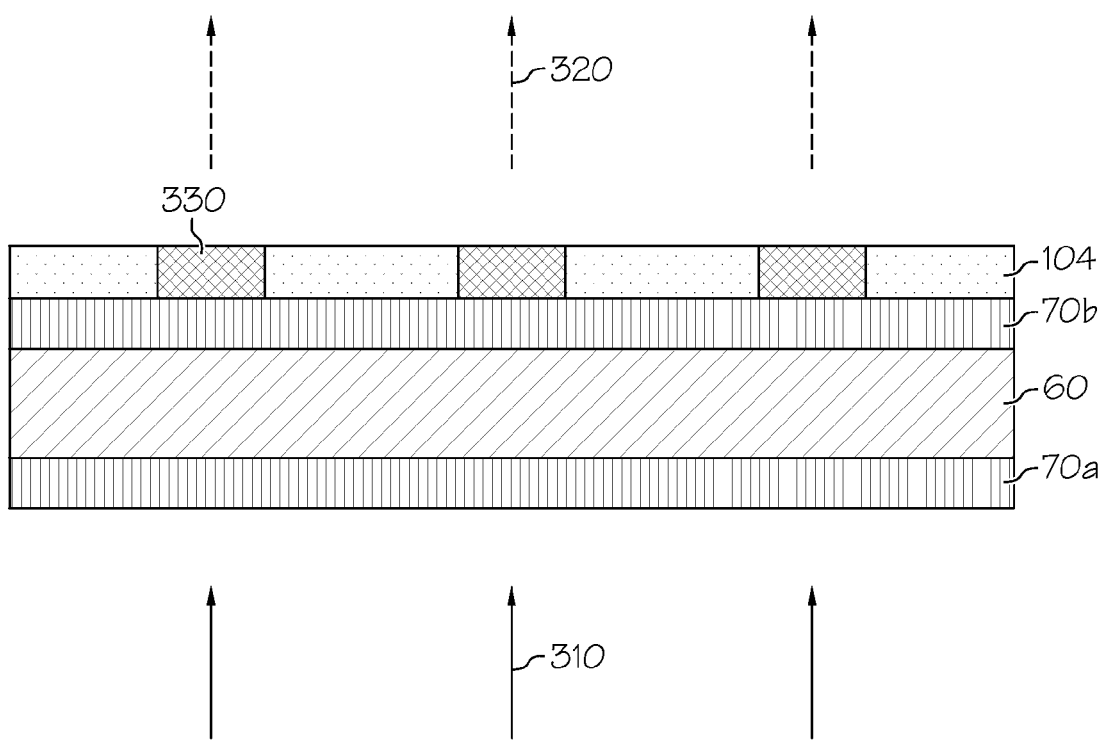
FIG. 8 depicts schematically the interaction of an input vibration/acoustic energy impinging on structure having disposed thereon a composite layer comprising nano tubes in a matrix arranged in the outer skin layer of the composite in accordance with a further embodiment disclosed and described herein.

FIG. 8 depicts schematically the interaction of input energy, for example, vibrations and/or acoustic energy 310 of a first magnitude generated externally and impinging on first face sheet 70a having composite layer of core 60 and nano-skin layer 104 disposed thereon, nano-skin layer 104 comprising regions of nano tubes ("nanopatches") 330 arranged adjacent second face sheet 70b of the composite. In this configuration, at least a portion of the vibration energy of the composite structure is at least partially converted into sub-sonic shear waves in the attached nano-layer. The sub-sonic shear waves travel essentially transverse to that of the bending waves. The spacing and arrangement of the regions comprising nano tubes can be periodic, random or combinations thereof and can be deduced and/or optimized using an analytical model of the structure. Analytical model may be in the form of a standard vibro-acoustic finite element model of the baseline composite structure, for example. In this configuration the nano patches with increased and/or reduced shear wave velocity, introduce changes in impedance in the path of the shear waves reducing its wave velocity. Attenuated vibrations and/or acoustic energy 320 of a second magnitude less than that of the first magnitude of impinging energy 310 radiates from the outer surface of nano-skin layer 104 into the ambient surroundings.

Thus, a method is provided comprising providing a substrate comprising a composite layer deposited thereon, the substrate being formed to provide at least one bending wave therein in response to receiving a vibration energy sufficient to cause the at least one bending wave in the substrate. At least a portion of the vibration energy sufficient to cause the at least one bending wave is converted to at least one shear wave in at least a portion of the composite layer. The composite layer comprises an elastomeric polymer matrix comprising carbon nano tubes dispersed or distributed therein. In one aspect, the elastomeric polymer matrix comprising carbon nano tubes is adjacent at least one face sheet. In another aspect, the elastomeric polymer matrix comprising carbon nano tubes is positioned between opposing face sheets.

In a second embodiment, a method of attenuating acoustic vibration energy in an aerospace vehicle is provided. The method comprises providing a fuselage comprising a composite layer deposited thereon, the fuselage being formed to provide at least one bending wave therein in response to receiving a vibration energy sufficient to cause the at least one bending wave in the fuselage, and converting at least a portion of the vibration energy sufficient to cause the at least one bending wave to at least one shear wave in at least a portion of the composite layer. The composite layer comprises an elastomeric polymer matrix comprising an amount of carbon nano tubes sufficient to convert the vibration energy sufficient to cause the at the least one bending wave from the fuselage into the at least one shear wave in the composite.

In a first aspect of the above methods, the method can further comprise attenuating acoustic radiation from the substrate. In a second aspect of the above methods, which can be in combination with the previous aspect, the amount of carbon nano tubes dispersed or distributed therein is capable of converting at least a portion of the vibration energy of the substrate to transverse shear energy of the composite layer.

In a third aspect of the above methods, which can be in combination with any of the previous aspects, the composite layer further provides viscoelastic dissipation of vibration energy. The viscoelastic properties are provided, at least in part, by the choice of elastomeric polymer used in combination with the carbon nano tubes. For example, PDMS polymer as a matrix material can provide viscoelastic dissipation when used in the composite.

In a fourth aspect of the above methods, which can be in combination with any of the previous aspects, the composite layer further provides electrical and/or thermal conductivity. Carbon nano tubes, for example, can be chemically modified with ionic substituents to provide or improve their electrical conductivity. Examples of such ionic substituents include salts of carboxyl acids or salts of amine bases.

In a fifth aspect of the above methods, which can be in combination with any of the previous aspects, the carbon nano tubes are preferentially oriented in the composite layer In a preferred aspect, the carbon nano tubes are preferentially oriented normal to the surface of the substrate or parallel to the surface of the substrate. In another aspect, a laminate of layers, each layer having differently (or preferentially) oriented carbon nano tubes (e.g., parallel/normal, parallel/normal/parallel, or normal/parallel/normal) can be employed.

In a sixth aspect of the above methods, which can be in combination with any of the previous aspects, the composite layer comprises a honey-combed structure positioned between the substrate and at least one face sheet. Opposing face sheets can be used.

In a seventh aspect of the above methods, which can be in combination with any of the previous aspects, the at least one bending wave is a result of energy from supersonic velocity and at least a portion of the transverse shear wave is of subsonic velocity.

Prophetic Design of Experiment

In order to demonstrate and evaluate the performance of the above disclosed nano layer composite in changing wave velocity in the nano-layer, a design of experiments is prepared and experiments are contemplated as follows. Suitable polymer materials for nano-layer sandwich core using appropriate selection criteria as described above are selected, including sandwich materials and both core and face sheets. Nano-fillers (SWCNT and/or MWCNT), sandwich core materials, and composite face sheets are procured, composite test assemblies are fabricated. Lab testing of cores before sandwich fabrication is envisaged. Fabrication of sandwich cores with and without nano-fillers is performed. Fabrication and co-curing of the selected composite face sheets with cores is then carried out. Electron microscopic inspections of nano-infused sandwich constructions as well as conducting laboratory tests on nano-infused sandwich cores to characterize mechanical properties is contemplated. The tensile and/or compressive modulus of the nano-infused sandwich constructions can be measured using standard test procedures, as well as shear modulus and storage and loss modulus. Testing on nano-composite sandwich beams can be performed, which may include measuring transfer function and wave number response. In addition, shear wave propagation within core can be characterized using known techniques.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations disclosed and described herein. The following claims are in no way intended to limit the scope of the invention to the specific embodiments described herein.

The invention claimed is:

1. A method comprising:
providing a substrate comprising a composite layer, the substrate being formed to provide at least one bending wave therein in response to receiving a vibration energy sufficient to cause the at least one bending wave in the substrate; and
converting at least a portion of the vibration energy sufficient to cause the at least one bending wave to at least one shear wave in a portion of the composite layer;
wherein the composite layer comprises an elastomeric polymer matrix comprising carbon nano tubes dispersed or distributed therein in an amount capable of converting at least a portion of the bending wave of the substrate to the at least one shear wave of the composite layer.

2. The method of claim 1, further comprising attenuating acoustic radiation from the substrate.

3. The method of claim 1, wherein the composite layer further provides viscoelastic dissipation of vibration energy.

4. The method of claim 1, wherein the composite layer further provides electrical and/or thermal conductivity.

5. The method of claim 1, wherein the carbon nano tubes are preferentially oriented in the composite layer.

6. The method of claim 1, wherein the composite layer comprises a honey-combed structure sandwiched between opposing face sheets, the elastomeric polymer matrix adjacent one of the face sheets, and the substrate adjacent the corresponding opposing face sheet.

7. The method of claim 1, wherein the at least one bending wave is a result of energy from supersonic velocity and at least a portion of the at least one shear wave is of subsonic velocity.

8. A method of attenuating acoustic vibration energy in an aerospace vehicle, the method comprising:
providing a fuselage comprising a composite layer deposited thereon, the fuselage being formed to provide at least one bending wave therein in response to receiving a vibration energy sufficient to cause the at least one bending wave in the fuselage; and
converting at least a portion of the vibration energy sufficient to cause the at least one bending wave to at least one shear wave in a portion of the composite layer;
wherein the composite layer comprises an elastomeric polymer matrix comprising an amount of carbon nano tubes sufficient to convert the at least one bending wave from the fuselage into the at least one shear wave in the composite.

9. The method of claim 8, wherein the composite layer further provides viscoelastic dissipation of vibration energy in the composite layer.

10. The method of claim 8, wherein the composite layer further provides electrical and/or thermal conductivity to the composite layer.

11. The method of claim 8, wherein the carbon nano tubes are preferentially oriented in the elastomeric polymer matrix.

12. The method of claim 8, wherein the composite the composite layer comprises a honey-combed structure sandwiched between opposing face sheets, the elastomeric polymer matrix adjacent one of the face sheets, and the fuselage adjacent the corresponding opposing face sheet.

13. The method of claim 8, wherein the at least one bending wave is of supersonic velocity and at least some of the at least one shear wave is of subsonic velocity.

14. An article comprising:
a composite layer comprising:
a substrate;
a first layer disposed on a surface of the substrate, the first layer comprising an elastomeric polymer or elastomeric pre-polymer and a predetermined amount of carbon nano tubes dispersed or distributed therein, the composite comprising an amount of the carbon nano tubes sufficient to receive vibration energy causing at least one bending wave in the substrate and to convert the vibration energy sufficient to cause the at least one bending wave to at least one shear wave in a portion of the composite.

15. The article of claim 14, further comprising a honey-combed structure sandwiched between opposing face sheets, the elastomeric polymer matrix adjacent one of the face sheets, and the substrate adjacent the corresponding opposing face sheet.

16. The article of claim 14, wherein the elastomeric polymer or elastomeric pre-polymer is at least one of a polysilicone, a fluorocarbon elastomer, a polyurethane, a blend of thermoplastic and thermoset rubber, a styrene-butadiene polymer, an ionomer, and a thermoset rubber.

17. The article of claim 16, wherein the amount of carbon nano tubes is about 3 wt % to about 5 wt %.

18. The article of claim 16, wherein the carbon nano tubes are preferentially oriented relative to the surface of the substrate.

19. The article of claim 14, wherein the substrate forms at least a part of an aerospace vehicle.

* * * * *